United States Patent
Dai

(10) Patent No.: US 10,180,987 B2
(45) Date of Patent: Jan. 15, 2019

(54) DATA PROCESSING

(71) Applicant: Alibaba Group Holding Limited, Grand Cayman (KY)

(72) Inventor: Ping Dai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 294 days.

(21) Appl. No.: 14/532,526

(22) Filed: Nov. 4, 2014

(65) Prior Publication Data

US 2015/0127704 A1 May 7, 2015

(30) Foreign Application Priority Data

Nov. 7, 2013 (CN) .......................... 2013 1 0551637

(51) Int. Cl.
*G06F 17/30* (2006.01)
*G06Q 10/08* (2012.01)
*G06Q 30/06* (2012.01)

(52) U.S. Cl.
CPC ... *G06F 17/30867* (2013.01); *G06Q 10/0838* (2013.01); *G06Q 30/0601* (2013.01)

(58) Field of Classification Search
CPC ........................... H04L 67/20; H04L 67/2809; H04L 2463/102
USPC ................... 709/201, 200, 206, 224
See application file for complete search history.

(56) References Cited

U.S. PATENT DOCUMENTS

| 2010/0274704 | A1* | 10/2010 | Yamamoto | G06Q 40/04 705/37 |
| 2011/0208670 | A1* | 8/2011 | Joseph | G06Q 40/06 705/36 R |
| 2013/0226727 | A1 | 8/2013 | Serra | |

OTHER PUBLICATIONS

First Search report for Chinese counterpart application No. 2013105516375 dated Jul. 19, 2017, 4 pages. (translated).
Machine translation of first Chinese Office Action dated Jul. 27, 2017 for counterpart application No. 201310551637.5, 15 pages.
Machine translation of second Chinese Office Action dated Jun. 15, 2018 for counterpart application No. 201310551637.5, 9 pages.

* cited by examiner

*Primary Examiner* — El Hadji M Sall
(74) *Attorney, Agent, or Firm* — Lee & Hayes, P.C.

(57) ABSTRACT

Example data processing methods and systems are provided. A server obtains first order data submitted by a client. The first order data includes user address information. A matching operation is performed according to the user address information in a preset database to find second order data that satisfies an address matching condition. A merging operation is applied to merge second order data that satisfies the address matching condition with the first order data from the client.

20 Claims, 5 Drawing Sheets

DATA PROCESSING

CROSS REFERENCE TO RELATED PATENT APPLICATIONS

This application claims foreign priority to Chinese Patent Application No. 201310551637.5 filed on 7 Nov. 2013, entitled "Date Processing Method and System," which is hereby incorporated by reference in its entirety.

TECHNICAL FIELD

The present disclosure is related to the Internet and, more particularly, to a data processing method and system.

BACKGROUND

On-line shopping is an emerging shopping method which is becoming more and more popular. Under the conventional techniques, each purchasing transaction order is made individually and shipped separately as well. Therefore, even though there are multiple buyers whose delivery addresses are the same or close to each other, such as within a same neighborhood, the transactions still have to be ordered and shipped separately.

Under the conventional techniques, on one hand, the transactions are ordered separately and may not be combined, thereby increasing a logistical cost and reducing a transaction success rate. On the other hand, the shipment for each buyer is performed separately. After a courier company ships the product, a shopping website needs to periodically query a server of the courier company to obtain logistics information of the product, such as a current location of the product. Thus, under the conventional techniques, the shopping website needs to send a plurality of query requests to the server of the courier company by using a plurality of courier tracking numbers, and to receive a plurality of logistics information returned by the server of the courier company. When there is a massive amount of users, the servers of both the shopping website and the courier company will have to face a significant throughput, and data transmission amount between the two servers will also become large, thereby easily causing network congestion.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides an example data processing method and system to resolve an increased burden of a server when there is a massive amount of inquires for logistic information caused by separate shipment for each transaction order under the conventional techniques.

The present disclosure provides an example data processing method. A server obtains first order data submitted by a client. The first order data includes user address information. A matching operation is performed according to the user address information to find second order data that satisfies an address matching condition from a preset database. A merging operation is applied to merge second order data that satisfies the address matching condition with the first order data from the client.

The example method may further include the following operation. The first order data submitted by the client is stored in the database when pre-stored data does not include any order data that matches the address matching condition.

After searching the second order data that satisfies the address matching condition, the example method may further include the following operations. Information of the second order data that satisfies the address matching condition is sent to the client. Instruction information, which agrees to merge the first order data from the client with the second order data that satisfies the address matching condition, is received from the client.

The merging operation that merges the second order data that satisfies the address matching condition and the first order data from the client may include the following operations. A merging operation is applied to quantity information of second order data that satisfies the address matching condition and quantity information of the first order data from the client. Quantity information of merged order data is calculated. If the calculated quantity information is larger than a preset threshold, the client is notified.

For example, the address matching condition may include a condition that a location or address information of second order data is the same as the user address information, and/or a condition that a location or address information of the second order data is within a predetermined range of distance from a geographic location of the user address information.

For example, the operation that obtains the user address information may include the following operations. A current geographic location of the user is obtained as the user address information. Alternatively, the user address information is provided by the client.

The present disclosure also provides an example data processing system. The system may include an obtaining module, a matching module, and a processing module. The obtaining module obtains first order data submitted by a client. The first order data includes user address information. The matching module performs a matching operation according to the user address information to find second order data that satisfies an address matching condition from a preset database. The processing module performs a merging operation to merge the second order data that satisfies the address matching condition with the first order data from the client.

For example, if the matching module does not find order data that matches the address matching condition, the processing module may store the first order data submitted by the client in the database.

For example, the system may also include a transmitting module that sends information of second order data that satisfies the address matching condition to the client and receives instruction information that agrees to merge the first order data from the client with the second order data that satisfies the address matching condition from the client. After the transmitting module receives the instruction information, the processing module performs the merging operation.

For example, the processing module may include a merging processing module and a notifying module. The merging processing module merges quantity information of the second order data that satisfies the address matching condition with quantity information of the first order data from the client and calculates quantity information of merged first order data. If the calculated quantity information is larger than a preset threshold, the notifying module notifies the client.

For example, the address matching condition may include a condition that a location or address information of the second order data is the same as the user address information, and/or a condition that a location or address information of the second order data is within a predetermined range of distance from a geographic location of the user address information.

For example, the obtaining module may include a first obtaining module or a second obtaining module. The first obtaining module obtains a current geographic location of the user is obtained as the user address information. The second obtaining module obtains the user address information provided by the client.

According to an example embodiment of the present disclosure, the present techniques obtain the first order data submitted by the client including the user address information, find the second order data in the pre-stored data that matches the user address information, and perform a merging operation to merge the first order data from the client and the second order data that matches the address matching condition. The present techniques merge multiple order data that satisfy the merging condition and inquire multiple order data through one order number, thereby reducing data transmission by the server and effectively reducing server burden when inquiring lots of logistics information. The present techniques also save logistics cost and improve business successful rate.

BRIEF DESCRIPTION OF THE DRAWINGS

The FIGs in the present disclosure are briefly described below to further illustrate the example embodiments of the present disclosure and constitute a portion of the present disclosure. The embodiments and their descriptions are only to illustrate the present disclosure and shall not be used to improperly limit the present disclosure.

DETAILED DESCRIPTION

The present techniques may be applicable in a network environment including at least one client or client terminal. The present techniques merge order data based on address information of client. For example, the present techniques merge order data that satisfies address merging conditions and search multiple order data through one order number, thereby reducing server burden when inquiring lots of logistical information. The present techniques accurately recommend transaction data information and calculate quantity information of transactions according to the address information of the client, thereby significantly improving transaction success rate and reducing logistical cost.

The detailed descriptions of the present disclosure will be provided by referring to example embodiments and accompanying FIGs in order to make the purpose, technical solutions and advantages of the present disclosure clearer. It is noted that the example embodiments described herein are only a part of, instead of all possible embodiments of the present disclosure. According to the example embodiments of the present disclosure, any other embodiments implemented by one of ordinary skill in the art without a creative effort should fall under the scope of protection of the present disclosure.

Figure 1:
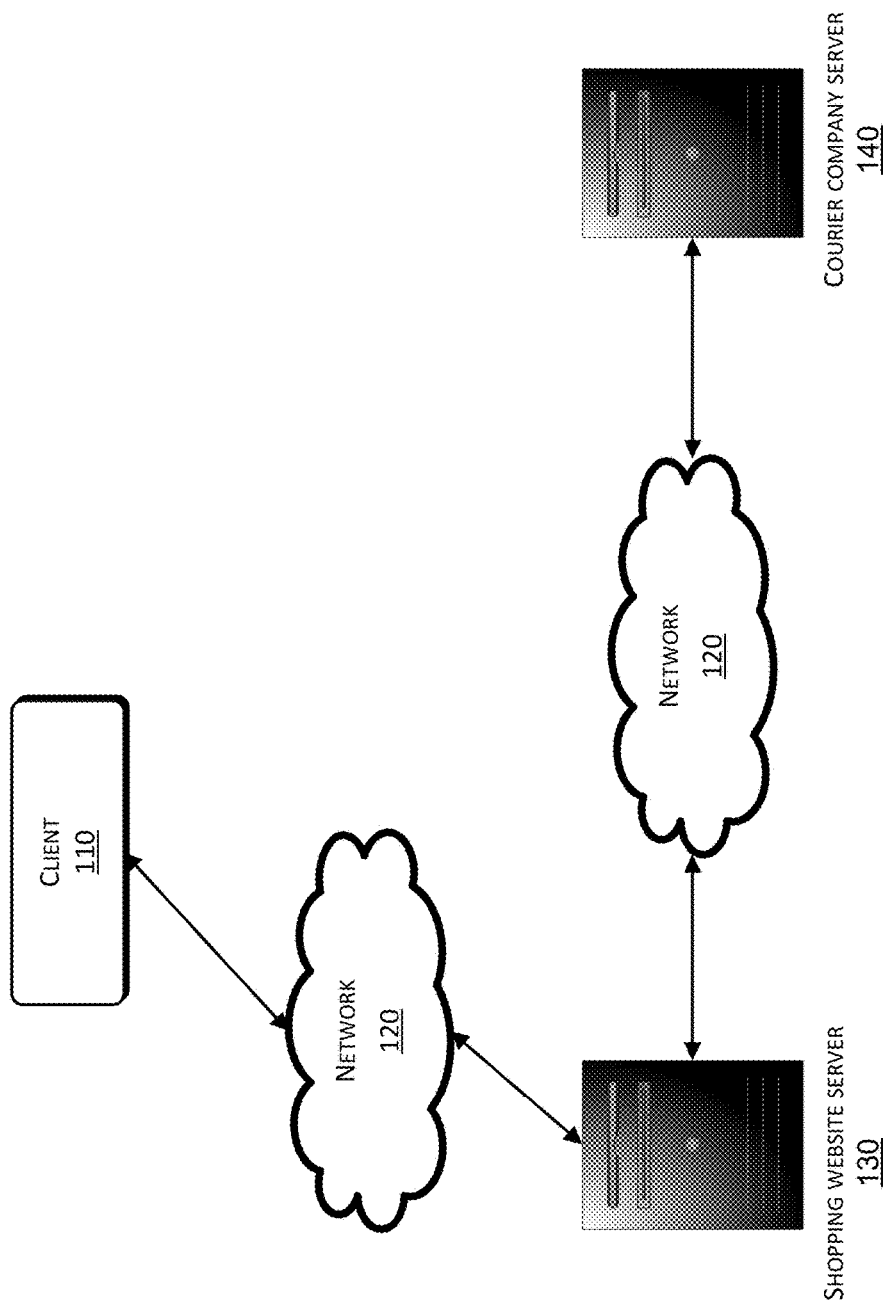
FIG. 1 is a diagram illustrating an example application scenario according to the present disclosure.

An example implementation scenario for the present disclosure is described before introducing the example data processing methods and systems. FIG. 1 is a diagram illustrating an example application scenario according to the present disclosure. As shown in FIG. 1, a client 110 is connected through a network 120 with a shopping website server 130. The shopping website server 130 is connected through the network 120 with a courier company sever 140.

Figure 2:
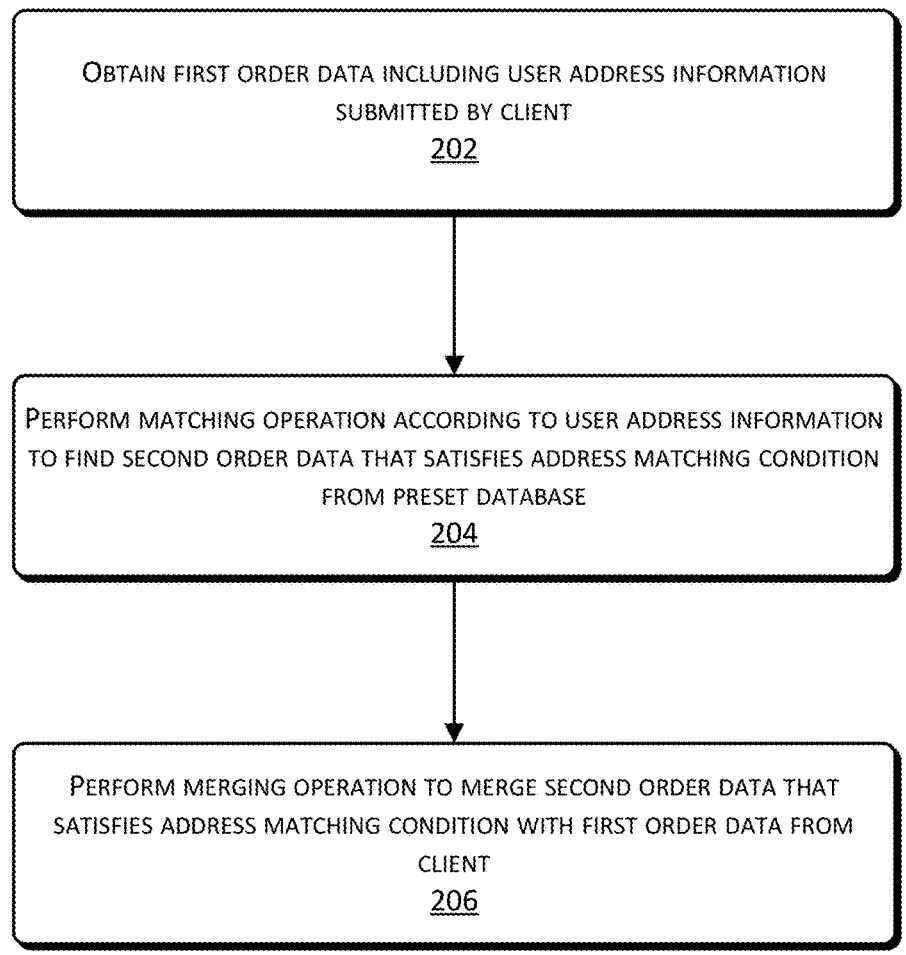
FIG. 2 is a flowchart illustrating an example data processing method according to the present disclosure.

The present disclosure also provides an example data processing method. FIG. 2 is a flowchart illustrating an example data processing method according to the present disclosure.

At 202, a server obtains first order data submitted by a client. The first order data includes user address information.

For example, the term "order data" may refer to order data that satisfies certain criteria. The order data for one or more designated transactions may be preset. For instance, in online shopping, the order data may be data including information of a product, a quantity of product, and a shipping address that is sent to the server from the client while the client is shopping at a specific online store.

According to an example embodiment of the present disclosure, the order data in a transaction process performed by the client includes content information, quantity information, and address information. For example, in online shopping, the content information may be a store name or a store identification, a product name or a product identification, by which a specific product purchased by the client may be determined. The quantity information may indicate an amount of purchased product and the address information may indicate a shipping address.

In a practical implementation, an example method for obtaining the user address information may include obtaining a current geographic location of the client as the user address information. For example, a global positioning system (GPS) localization method may be used to obtain the current geographic location of the client. Alternatively, the user address information may be provided by the client. The present disclosure does not limit the method for obtaining the user address information.

At 204, a matching operation is performed according to the user address information to find second order data that satisfies an address matching condition from a preset database.

For example, the database may store a massive amount of order data. This information may be stored in different groups according to the address information of the order data. For instance, order data whose address information is the same or near each other may be stored in the same group. If there is not any other order data having the same or nearby address information, the order data will be stored as an individual group. For example, in online shopping, the database stores order data for which the products have been ordered but for which shipping has not started. The order data is grouped into a first group, a second group . . . a Nth group, according to the address information thereof. First order data of the products that have been ordered and started to ship is removed from the database.

For example, the address matching condition is preset during the process of the matching operation. An order data group that matches the address information of the client is searched in the database to find the order data that matches the address matching condition.

For example, the address matching condition may include a condition that a location or address information of the second order data is the same as the user address information, and/or a condition that a location or address information of the second order data is within a predetermined range of distance from a geographic location of the user address information.

For example, the address matching condition is used to find stored the second order data having the same content information as the first order data of the client and matching the address information.

At 206, a merging operation is performed to merge the second order data that satisfies the address matching condition with the first order data from the client.

As the first order data from the client and the found second order data that satisfies the address matching condition have the same or matched content information and address information, during the merging process, the present techniques merge quantity information in the multiple order data that satisfy the address matching condition and user address information in the order data. For example, the process of merging the user address information in the order data may include the following. When the plurality of order data has the same user address information, the user address information is used as the shipping address of the product. When the user address information of the multiple order data is located within a predetermined geographic range, one user address information of the multiple order data or address information recommended by a system is used as the shipping address of the product.

According to an example embodiment of the present disclosure, before the process of merging, instruction information that agrees to the merging is received from the client. For example, information of the second order data that satisfies the address matching condition is sent to the client. If instruction information that agrees to merge with the second order data that satisfies the address matching condition is received from the client, the process of merging is performed. Otherwise, the process of merging is not performed. According to an example embodiment of the present disclosure, if there is a plurality of the order data that satisfies the address matching condition, the plurality of the second order data is sent to the client, and one second order data selected by the client from the plurality of second order data is received from the client. Then the merging is processed according to the second order data selected by the client.

After the merging operation, the quantity information of the order data that has been merged is counted or calculated. The client will be notified when the counted quantity information is larger than a preset threshold value.

According to an example embodiment of the present disclosure, the first order data of the client is stored at the database as target data for next matching when none of the order data from the pre-stored order data satisfies the address matching condition.

Figure 3:
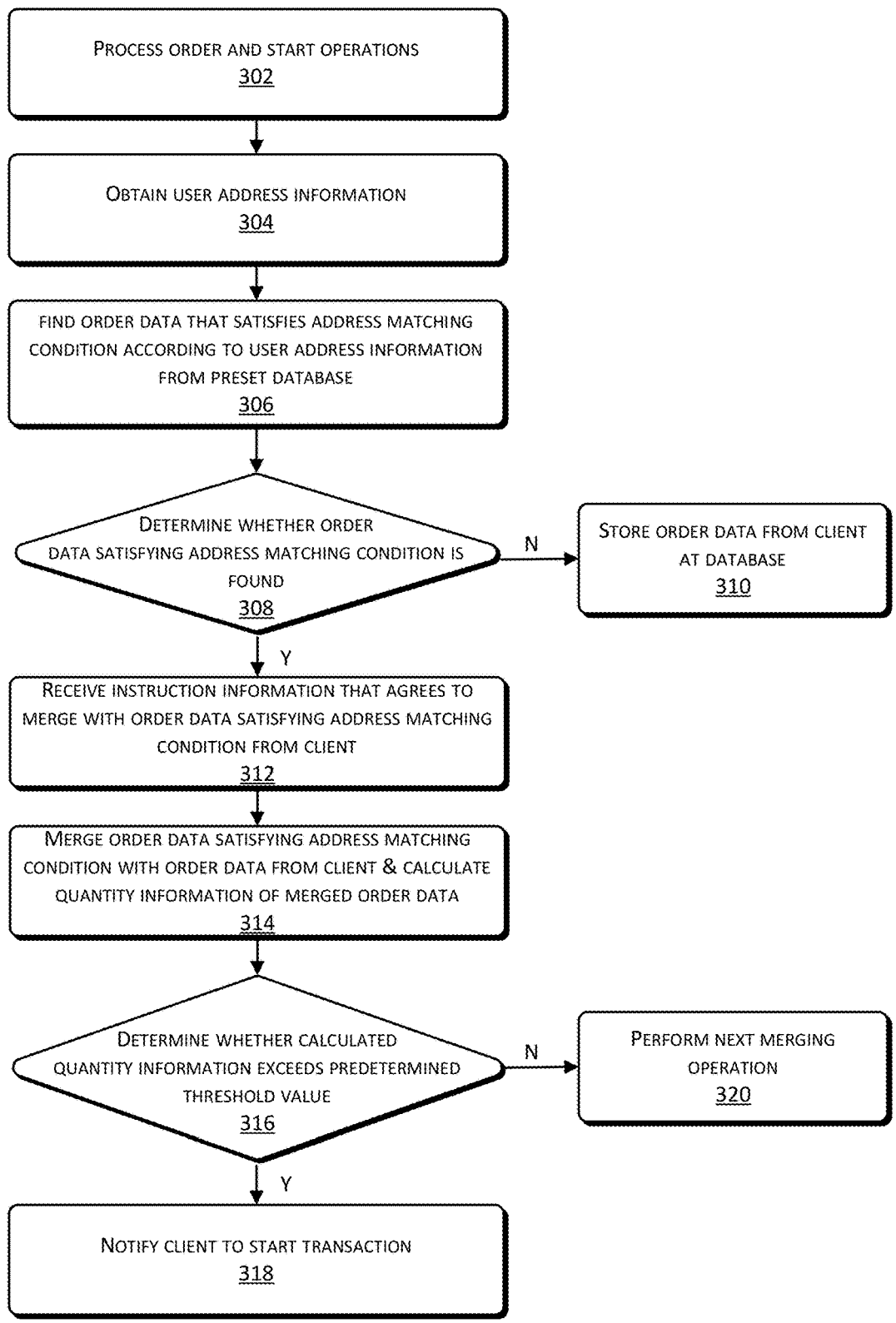
FIG. 3 is a flowchart illustrating another example data processing method according to the present disclosure.

The details of the above process are described with reference to FIG. 3. FIG. 3 is a flowchart illustrating an example data processing method according to another example embodiment of the present disclosure. As shown in FIG. 3, the method includes the following operations.

At 302, an example method of the present disclosure is performed while the client processes an order. For example, the method is performed by a client A when the client A browses a product X of an online store during online shopping.

At 304, first order data submitted by a client is obtained. The first order data includes user address information. In a practical implementation, a current geographic location of the client may be obtained as the user address information. For example, a localization technique may be used to obtain the current geographic location of the client which is a mobile client. This geographic location is used as the user address information after the client confirms such location. In addition, the client during a transaction operation process may actively provide information including content information, quantity information, and address information of the transaction. Thus, the user address information is obtained based on the above information provided by the client.

For example, in an example online shopping transaction, an obtained current geographic location of the client is "No. 6, Xitucheng Road, Jimenqiao, Haidian District, Beijing City." Such address is used as a shipping address of the client after such address is confirmed by the client.

At 306, a matching operation is performed according to the user address information to find second order data that satisfies an address matching condition from a preset database.

According to the above example, among order data that corresponds to the product X in the database, a matching operation is performed according to the shipping address "No. 6, Xitucheng Road, Jimenqiao, Haidian District, Beijing City" of the client A, to find the second order data that matches the address matching condition. The address matching condition as described herein may be preset. For instance, the address matching condition may be a location within 1000 meters from the shipping address of the client A.

At 308, the present techniques determine whether there is second order data that matches the address matching condition. If there is second order data matching the address matching condition, operations at 312 are performed. Otherwise, operations at 310 are performed.

At 310, when there is no second order data that matches the address matching condition in the pre-stored order data, the first order data of the client is stored in the database. For example, the following information of the client A is stored in the database including: a store name or a store identification, a product name or a product identification, a quantity of the product, and a shipping address. The first order data presently stored in the database may be used as target data for a next matching process.

At 312, if there is second order data that matches the address matching condition in the pre-stored order data, the found information of the second order data that matches the address matching condition is sent to the client. If instruction information that agrees to merge with the second order data satisfying the address matching condition is received from the client, operations at 314 are performed. Otherwise, the merging operation will not be performed and the process is ended.

According to an example embodiment of the present disclosure, if there is a plurality of second order data that satisfies the address matching condition is found, the plurality of second order data is sent to the client. For instance, a piece of second order data selected by the client from the plurality of second order data may be received from the client. Quantity information that corresponds to the second order data selected by the client is merged with quantity information of the first order data of the client. According to the above example, 3 groups of transactions are found to match the client A, which includes a first group (whose address is within 100 m from the shipping address of the client A), a second group (whose address is within 500 m from the shipping address of the client A), and a third group (whose address is within 1000 m from the shipping address of the client A. For instance, the above information is sent to the client for the client to select one of them, and the selected group is merged with the first order data of the client.

According to an example embodiment of the present disclosure, if there is one second order data found to satisfy the address matching condition, such second order data is sent to the client for the client to determine whether to merge with the first order data. If instruction information that agrees to merge is received from the client, quantity information that corresponds to the second order data is merged with quantity information of the first order data of the client.

At 314, the merging operation is applied to merge the second order data that satisfies the address matching condition with the first order data from the client and quantity information of order data that has been merged is counted or calculated.

When order data relating to a same type of transaction is merged, all of the order data relating to the same type of transaction is re-calculated to merge the quantity information thereof. The original first order data of the client still exists. After calculation, quantity information corresponding to each address information and total quantity information of the transaction are obtained.

At 316, the present techniques determine whether the calculated quantity information exceeds a predetermined threshold value. If the calculated quantity information exceeds the predetermined threshold value, at 318, the client is notified and the transaction is completed.

For example, an online shopping website (such as a B2B website) may have a certain quantity requirement of the purchased product. For instance, a minimum amount of 10 product X is required to purchase for transaction and shipping. If the client A only purchases 5 product X, the transaction is not processed under the conventional techniques.

According to an example embodiment of the present disclosure, transactions from multiple clients that purchase the product X are merged. If a client B purchases 5 product X and shipping addresses of the client A and the client B satisfy a condition for shipping together, the transactions of the client A and the client B are merged to be processed in one order. Thus, the present techniques not only improve a transaction successful rate but also reduce a logistics cost of a seller.

If the calculated quantity information does not exceed the preset threshold value, the process waits for a next transaction. At 320, the process proceeds to next transaction. After a next merging processing is performed, operations at 314 are performed.

The present disclosure also provides an example data processing system. In an example embodiment of the present disclosure, the system may be set at a server side server. The server side device communicates with at least one client through a network.

Figure 4:
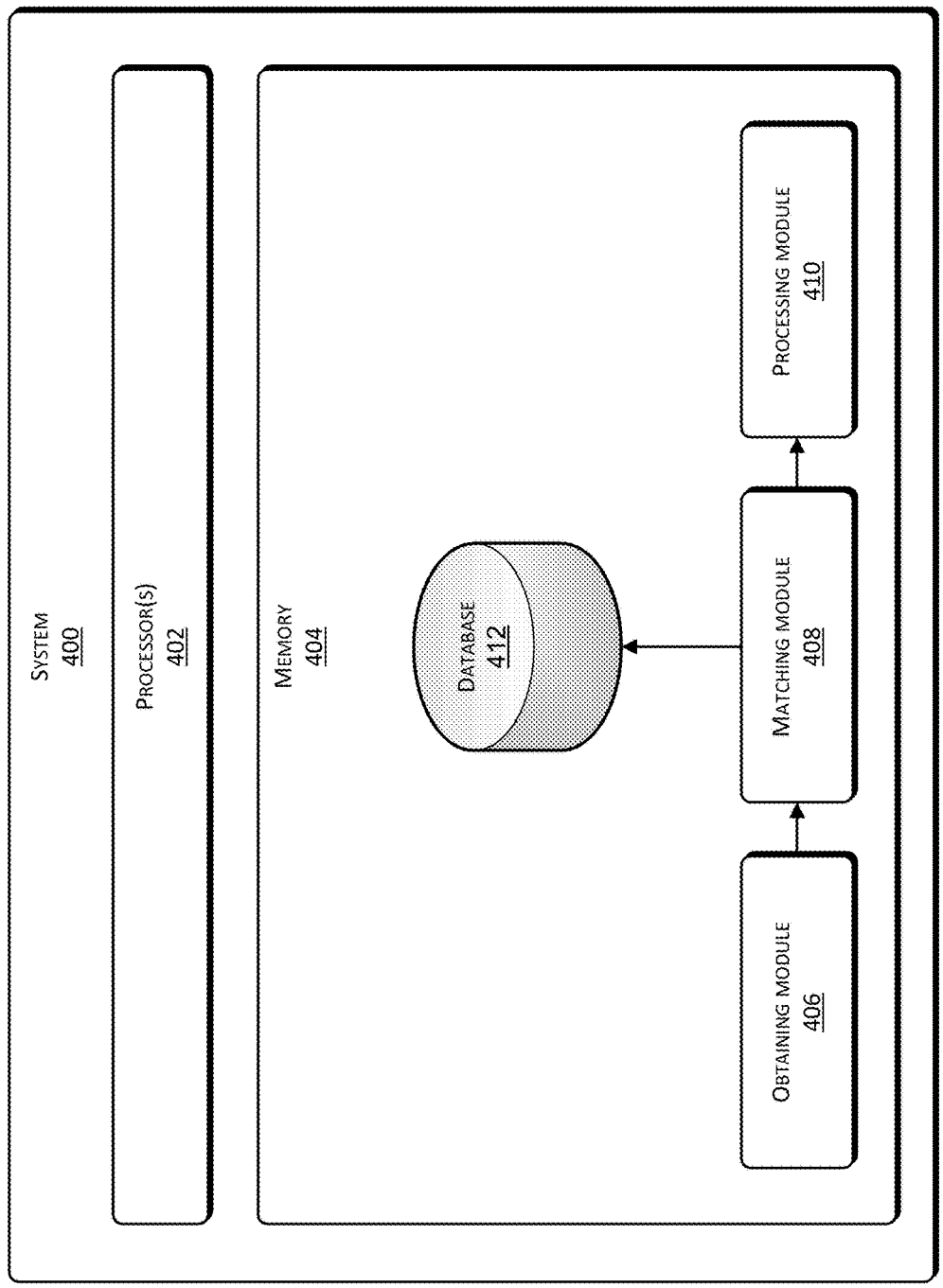
FIG. 4 is a diagram illustrating an example data processing system according to the present disclosure.

FIG. 4 is a diagram illustrating an example data processing system 400 according to the present disclosure. The system 400 may include one or more processor(s) 402 or data processing unit(s) and memory 404. The memory 404 is an example of computer-readable media. The memory 404 may store therein a plurality of modules including an obtaining module 406, a matching module 408, a processing module 410, and a database 412. The obtaining module 406 obtains first order data submitted by a client. The first order data includes user address information. By referring to FIG. 5, the obtaining module 406 may further include a first obtaining module 502 and a second obtaining module 504. The first obtaining module 502 obtains a current geographic location of the client as the user address information. The second obtaining module 502 obtains the user address information provided by the client.

Referring to FIG. 4, the matching module 408 couples with the obtaining module 406. The matching module 408 performs a matching operation according to the user address information in the database 412 to find second order data that satisfies an address matching condition.

For example, the address matching condition is preset during the process of matching. One or more order data groups that satisfy the user address information are searched in the database. One or more second order data that satisfies the address matching condition are found.

For example, the address matching condition may include a condition that a location or address information of the second order data is the same as the user address information, and/or a condition that a location or address information of the second order data is within a predetermined range of distance from a geographic location of the user address information.

In other words, by setting the address matching condition, stored second order data having the content information that is the same as the first order data of the client and matching address information with the first order data of the client is found.

Figure 5:
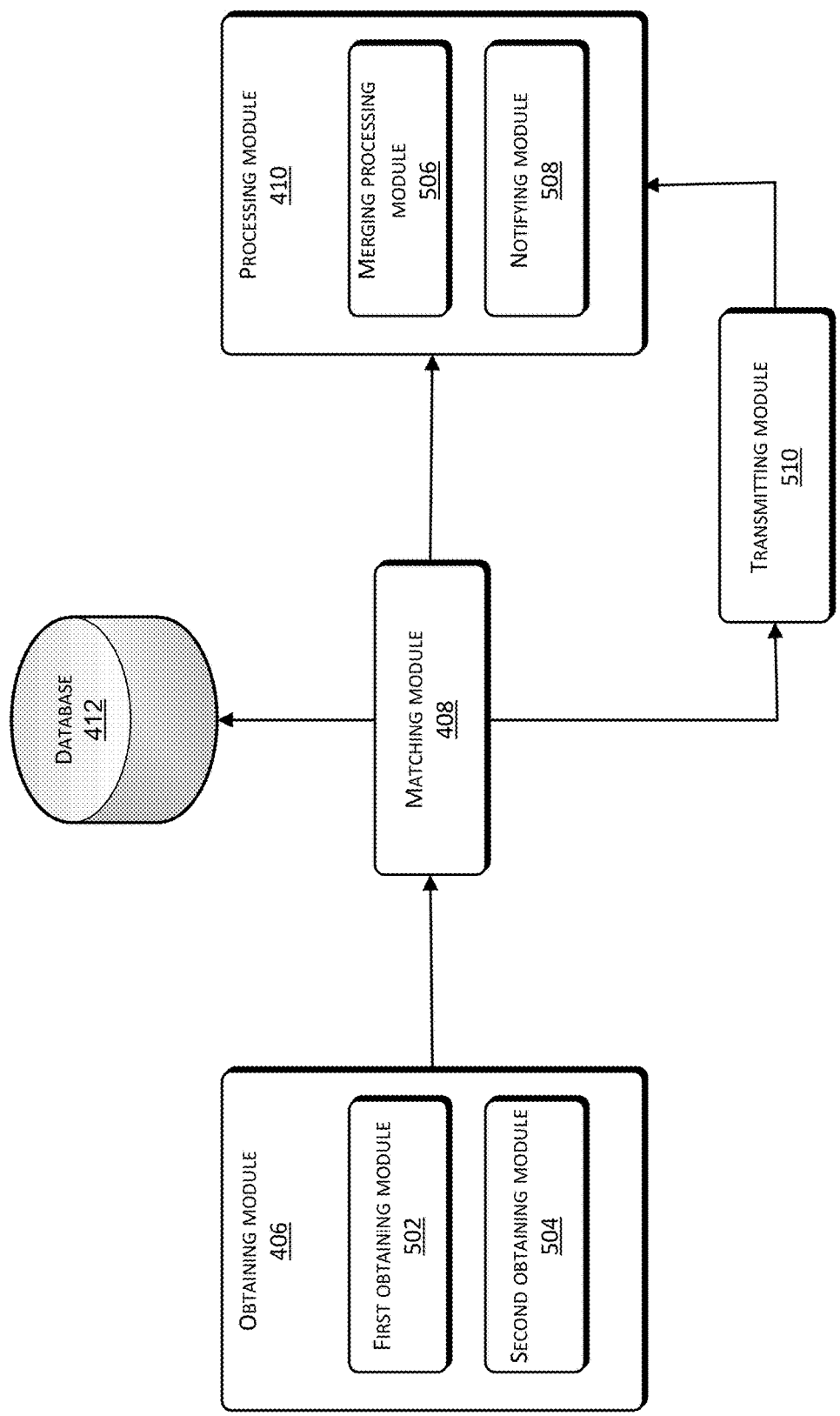
FIG. 5 is a diagram illustrating another example data processing system according to the present disclosure.

The processing module 410 couples with the matching module 408. The processing module 410 performs a merging operation to merge second order data that satisfies the address matching condition with the first order data from the client. Referring to FIG. 5, the processing module 410 may include a merging processing module 506 and a notifying module 508. The merging processing module 506 merges quantity information of the second order data that satisfies the address matching condition with quantity information of the first order data from the client and calculates quantity information of merged order data. If the calculated quantity information is larger than a preset threshold, the notifying module 508 notifies the client.

According to an example embodiment of the present disclosure, if the matching module 408 does not find the second order data that satisfies the matching condition, the processing module 410 stores the first order data from the client to the database 412.

Referring to FIG. 5, according to an example embodiment of the present disclosure, the system 400 may also include a transmitting module 510 that couples with the matching module 408 and the processing module 410. The transmitting module 510 sends information of the second order data that satisfies the address matching condition to the client, which is found by the matching module 408, and receives instruction information from the client that agrees to merge the first order data from the client with the second order data that satisfies the address matching condition.

After the transmitting module 510 receives the instruction information, the transmitting module 510 notifies the processing module 410. The processing module 410 performs the merging operation. In other words, the processing module 410 performs the merging operation after the transmitting module 510 receives instruction information from the client that agrees to merge with the second order data that satisfies the address matching condition.

The operations in the example methods of the present disclosure correspond to the characteristic features of the example system embodiments of the present disclosure and may be referenced to each other. The characteristic details of the example embodiments are not detailed herein.

According to the example embodiments of the present disclosure, the present techniques obtain the first order data submitted by the client including the user address information, find the second order data in the pre-stored data that matches the user address information, and perform a merging operation to merge the first order data from the client and the second order data that matches the address matching condition. The present techniques merge multiple order data that satisfy the merging condition and search multiple order data through one order number, thereby reducing data transmission by the server and effectively reducing server burden when inquiring lots of logistics information. The present techniques merge transaction data information based on transaction addresses of the client, thereby saving logistics cost and improving transaction successful rate.

In a standard configuration, a computing device, such as the server, the terminal or the near-field device, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the element.

One of ordinary skill in the art would understand that the example embodiments may be presented in the form of a method, a system, or a computer software product. Thus, the present techniques may be implemented by hardware, computer software, or a combination thereof In addition, the present techniques may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. A method comprising:
   obtaining first order data, the first order data including first user geographical location address information of a first client and a first quantity of a first product;
   searching, in a database, for second order data that satisfies an address matching condition with the first order data, the second order data including second user geographical location address information of a second client different from the first client and a second quantity of a second product;
   performing a merging operation of the second order data and the first order data when the address matching condition is satisfied; and
   determining to ship the first quantity of the first product for the first client and the second quantity of the second product for the second client together.

2. The method of claim 1, further comprising storing the first order data at the database when the address matching condition is not satisfied.

3. The method of claim 1, further comprising storing the second order data.

4. The method of claim 3, further comprising receiving instruction information from the first client that agrees to merge the second order data with the first order data.

5. The method of claim 1, wherein the performing the merging operation of the second order data and the first order data comprises:
   merging the second quantity of the second product with the first quantity of the first product, the first product being the same as or different from the second product; and
   calculating quantity information of merged order data.

6. The method of claim 5, further comprising notifying the first client in response to determining that the calculated quantity information of the merged order data is larger than a preset threshold value.

7. The method of claim 1, wherein the address matching condition further includes another condition that the second user geographical location address information of the second client is the same as the first user geographical location address information of the first client.

8. The method of claim 1, wherein the address matching condition includes a condition that the second user geographical location address information of the second client is within a preset distance from a geographical location corresponding to the first user geographical location address information of the first client.

9. The method of claim 1, wherein the obtaining the first order data comprises obtaining a current geographical location of the first client as the first user geographical location address information of the first client.

10. The method of claim 1, wherein the obtaining the first order data comprises obtaining the first user geographical location address information of the first client provided by the first client.

11. A system comprising:
one or more processors; and
one or more memories stored thereon computer-executable instructions executable by one or more processors to perform operations comprising:
obtaining first order data, the first order data including first user geographical location address information of a first client and first order information from the first client to a seller,
searching, in a database, for second order data that satisfies an address matching condition according to a first geographical location corresponding to the first user geographical location address information of the first client, the second order data including second user geographical location address information of a second client and second order information from the second client to the seller, the address matching condition including a condition that a second geographical location corresponding to the second user geographical location address information of the second client is within a preset distance from the first geographical location, and
performing a merging operation of the second order data and the first order data when the address matching condition is satisfied.

12. The system of claim 11, wherein the operations further comprise storing the first order data at the database when the address matching condition is not satisfied.

13. The system of claim 11, wherein the operations further comprise storing the second order data.

14. The system of claim 11, wherein the performing the merging operation of the second order data and the first order data comprises performing the merging operation after receiving instruction information from the first client that agrees to merge the second order data with the first order data.

15. The system of claim 11, wherein the performing the merging operation of the second order and the first order data comprises:
merging quantity information of the second order data with quantity information of the first order data; and
calculating quantity information of merged order data.

16. The system of claim 15, wherein the operations further comprise notifying the first client in response to determining that the calculated quantity information of the merged order data is larger than a preset threshold value.

17. The system of claim 11, wherein the address matching condition includes:
a condition that the second user geographical location address information of the second client is the same as the first user geographical location address information of the first client.

18. The system of claim 11, wherein the obtaining the first order data includes:
obtaining a current geographical location of the first client as the first user geographical location address information of the first client; or
obtaining the first user geographical location address information of the first client provided by the first client.

19. One or more memories having stored thereon computer-executable instructions executable by one or more processors to perform operations comprising:
obtaining first order data, the first order data including first user geographical location address information of a first client and first order information from the first client to a seller; and
searching, in a database, for second order data that satisfies an address matching condition according to a first geographical location corresponding to the first user geographical location address information of the first client, the second order data including second user geographical location address information of a second client and second order information from the second client to the seller, the address matching condition including a condition that a second geographical location corresponding to the second user geographical location address information of the second client is within a preset distance from the first geographical location.

20. The one or more memories of claim 19, wherein the operations further comprise performing a merging operation of the second order data and the first order data.

* * * * *